United States Patent
Feldman et al.

[15] 3,691,134
[45] Sept. 12, 1972

[54] POLYURETHANES PREPARED FROM CYCLO-ALKYL DIISOCYANATES

[72] Inventors: Julian Feldman; Robert J. Shaw, both of Cincinnati, Ohio

[73] Assignee: National Distillers and Chemical Corporation, New York, N.Y.

[22] Filed: April 27, 1970

[21] Appl. No.: 43,253

Related U.S. Application Data

[63] Continuation of Ser. No. 694,114, Dec. 28, 1967, Pat. No. 3,625,986.

[52] U.S. Cl. ......260/77.5 AT, 117/161, 260/2.5 AT, 260/75 NT, 260/77.5 AC
[51] Int. Cl. ..........................................C08g 22/18
[58] Field of Search.......260/2.5 AT, 453 A, 75 NT, 77.5 AT, 260/453 AL

[56] References Cited

UNITED STATES PATENTS

| | | | |
|---|---|---|---|
| 3,087,912 | 4/1963 | Wagner et al. | 260/67 |
| 3,352,830 | 11/1967 | Schmitt | 260/77.5 |
| 3,553,249 | 1/1971 | Brotherton | 260/468 |
| 3,549,569 | 11/1970 | Farah et al. | 260/18 |

*Primary Examiner*—Donald E. Czaja
*Assistant Examiner*—H. S. Cockeram
*Attorney*—Allen A. Meyer, Jr.

[57] ABSTRACT

Polyurethanes are prepared from alkyl diisocyanates such as 1-(isocyanatomethyl)-1-( 3-isocyanatopropyl)-cyclohexane; 1-(isocyanatomethyl)-1-(3-isocyanatopropyl)-4-ethyl-5-n-propyl-cyclohexane and bicyclo[2.2.1]2-isocyanatomethyl-2-(3-isocyanatopropyl) heptane and glycols.

6 Claims, No Drawings

POLYURETHANES PREPARED FROM CYCLOALKYL DIISOCYANATES

This application is a continuation of application Ser. No. 694,114 filed Dec. 28, 1967, which issued Dec. 7, 1971 as U.S. Pat. No. 3,625,986. This invention relates to alkyl diisocyanates in which the 2-carbon on the alkyl chain is part of a cycloaliphatic ring, to a process for preparing such diisocyanates, to polyurethanes prepared employing such diisocyanates, and to a process for producing such polyurethanes.

Polyurethanes are polymers of glycols with aliphatic or aromatic diisocyanates. For example, Perlon U polyurethane is the polymer of tetramethylene glycol and hexamethylene diisocyanate, according to the equation:

$nHO(CH_2)_4OH + nOCN(CH_2)_6NCO \longrightarrow$

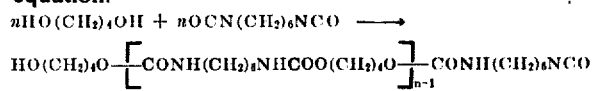

The lower aliphatic diisocyanates that are normally used in making polyurethanes are relatively volatile compounds and their vapors have a high toxicity which makes handling these compounds rather hazardous. Aromatic diisocyanates can be employed in place of aliphatic diisocyanates. However, the polyurethanes prepared by reacting aromatic diisocyanates with glycols tend to discolor rapidly, more so than where aliphatic diisocyanates are employed. The cycloaliphatic diisocyanates of the instant invention have been found to be especially useful in the preparation of polyurethanes inasmuch as the cycloaliphatic diisocyanates are less volatile and therefore less hazardous than the aliphatic diisocyanates employed heretofore. Furthermore, the polyurethanes produced by reacting the cycloaliphatic diisocyanates with glycols in accordance with conventional polyurethane preparatory procedures discolor at a much slower rate than do those produced employing aromatic diisocyanates.

The invention provides a process for preparing high molecular weight alkyl diisocyanates in which the 2-carbon atom on the alkyl chain is part of a cycloaliphatic ring, from low molecular weight dinitriles, which comprises reacting a 2-methylene aliphatic dinitrile with a 1,3-diene or a 1,3-cycloalkadiene in the Diels-Alder reaction to form a ring-unsaturated cycloaliphatic dinitrile wherein one of the two nitrile groups is attached via an alkyl group to the same ring carbon atom as the other nitrile group, reducing the ring-unsaturated cycloaliphatic dinitrile to the corresponding ring-saturated cycloaliphatic diamine, and reacting the ring-saturated cycloaliphatic diamine or a salt thereof with phosgene to form the alkyl diisocyanates.

By the process of the invention, it is now possible to prepare alkyl diisocyanates of a complicated structure, having a higher molecular weight than the aliphatic diisocyanates heretofore employed in making polyurethanes, and which are difficult of access by other routes, starting with simple starting materials that are readily available, such as 1,3-dienes, and 2-methylene glutaronitrile and itacononitrile, which are also readily prepared by conventional processes. In these alkyl diisocyanates, the 2-carbon atom in the alkyl chain is a ring carbon in a cycloaliphatic ring with the alkyl isocyanate groups attached thereto, one of which is a methyl isocyanate group and the other an alkyl isocyanate group having two or three carbon atoms in the alkyl chain. The cycloaliphatic group can be a cyclohexane ring or a bicyclo or tricyclo ring in which the endo carbon atom can have none or a variety of alkyl substituents.

The alkyl diisocyanates in accordance with the instant invention are accordingly emcompassed by the following formula:

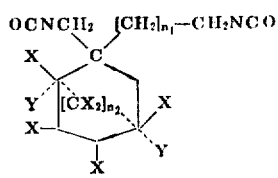

(I)

The 2-cyclohexane alkyl diisocyanates and 2-cyclohexane-containing condensed ring alkyl diisocyanates are defined as follows:

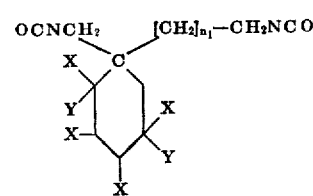

(II)

The bicyclo- and tricycloalkane alkyl diisocyanates are defined as follows:

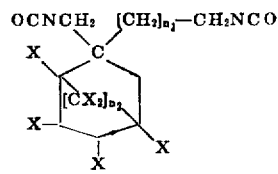

(III)

In the above formulas, X and Y can be the same or different, and are selected from the group consisting of hydrogen, halogen, alkyl having from about one to about twelve carbon atoms, alkylene having from about one to about 12 carbon atoms, alkoxy having from about one to about eight carbon atoms, and aryl having from about six to about 12 carbon atoms;

$n_1$ is the integer 1 or 2.

$n_2$ is an integer ranging from zero to about three and Y is present only when $n_2$ is zero. When $n_2$ is zero, the ring is cyclohexane, and when $n_2$ is one to three, the ring is a bicycloalkane ring.

Preferably, $n_1$ is two, $n_2$ is zero, and X and Y are hydrogen.

The X groups on adjacent carbon atoms in formulas I, II, and III can be interconnected by hydrocarbon, ether or ester bridges to form a variety of cycloaliphatic and heterocyclic ring compounds. Thus, for example, two X groups can be taken together as an alkyl group having from about three to about six carbon atoms, thereby forming a second or third cycloaliphatic ring as in indane or tetralin, or as an oxyalkyl group having from about two to about five carbon atoms and one or two ether oxygens, thereby forming an oxygen-containing heterocyclic ring or an ester group having from about three to about six carbon atoms, thereby forming a lactone ring. Thus, for example, a five-membered oxyheterocyclic ring can have one oxygen atom, a sixmembered oxyheterocyclic ring can have two oxygen atoms and a seven- or eight-membered oxyheterocyclic ring can have three oxygen atoms.

Typical alkyl groups include methy, ethyl, propyl, isopropyl, n-butyl, isobutyl, tertiary butyl, secondary butyl, amyl, hexyl, isoamyl, isohexyl, tertiary hexyl, heptyl, isoheptyl, n-octyl, 2-ethylhexyl, isooctyl, nonyl, decyl, undecyl, and dodecyl.

Typical alkoxy groups include methoxy, ethoxy, butoxy, propoxy, amyloxy, hexoxy, heptoxy, octoxy, and decyloxy.

Typical alkylene groups include methylene, ethylene, 1,3-propylene, 1,2-propylene, 1,2-butylene, 1,3-butylene, 1,4-butylene, and like amylene, hexylene, heptylene, octylene and decylene radicals.

The halogen can be fluorine, bromine, chlorine, or iodine.

Typical aryl groups include phenyl, p-tolyl, o-tolyl, p-xylyl, and naphthyl.

Examples of 1,1-diisocyanato alkyl cyclohexane in accordance with the invention include, but are not limited to,

- 1-(isocyanatomethyl)-1-(3-isocyanatopropyl) cyclohexane;
- 1-(isocyanatomethyl)-1-(2-isocyanatoethyl) cyclohexane;
- 1-(isocyanatomethyl)-1-(3-isocyanatopropyl)-4-methyl-cyclohexane, and similar 3-methyl compounds.
- 1-(isocyanatomethyl)-1-(3-isocyanatopropyl)-2,3,4,5,-tetrachlorocyclohexane;

Examples of 2,2-diisocyanato alkyl bicycloalkanes in accordance with the invention as represented by Formulas I and III include, but are not limited to,

- bicyclo[2.2.1]-2-isocyanatomethyl-2-(3-isocyanatopropyl)-heptane;
- bicyclo[2.2.1]-2-isocyanatomethyl-2-(3-isocyanatopropyl)-7,7-dimethyl-heptane;
- bicyclo [2.2.1]-2-isocyanatomethyl-2-(3-isocyanatopropyl)-1,4,-5,6,7,⁷-hexachloro-heptane.

Examples of alkyl diisocyanates in accordance with the invention wherein two X groups are interconnected by hydrocarbon, ether or ester bridges and which include bi- and tricycloalkane alkyl diisocyanates, indanes and tetralins, include, but are not limited to,

- bicyclo [4.3.0]-2-isocyanatomethyl-2-(3-isocyanatopropyl)-nonane;
- bicyclo [4.4.0]-2-isocyanatomethyl-2-(3-isocyanatopropyl)-decane;
- tricyclo [2.2.1.3⁶,⁵]-2-isocyanatomethyl-2-(3-isocyanatopropyl)-decane;
- 3-oxabicyclo [3.4.0]-8-isocyanatomethyl-8-(3-isocyanatopropyl)-nonane; and
- 3-oxatricyclo [3.4.0.1¹,⁷]-8-isocyanatomethyl-8-(3-isocyanatopropyl)-decane.

PREPARATION OF RING-UNSATURATED CYCLOALIPHATIC DINITRILES

In the process of the invention for preparing the alkyl diisocyanates, the 1,3-diene is reacted with the 2-methylene aliphatic dinitrile to produce a ring-unsaturated cycloaliphatic dinitrile in a Diels-Alder condensation such as that described in U.S. Pat. No. 3,515,740,, titled "Cyano Cyclohexenyl Compounds," which issued June 2, 1970, according to the following equation:

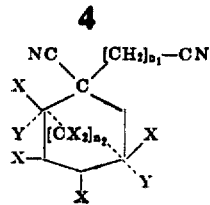

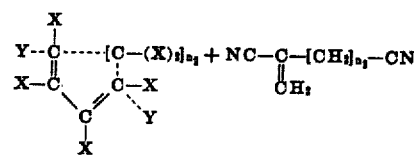

wherein X, Y, and $n_1$ and $n_2$ are as defined hereinbefore.

The 2-methylene aliphatic dinitriles employed are defined by the formula:

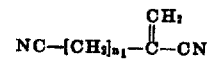

wherein $n_1$ is as defined hereinbefore, and the total number of carbon atoms in the dinitrile is five or six. Exemplary of the aliphatic dinitriles falling within the above class are 2-methylene glutaronitrile and and itaconodinitrile.

The 2-methylene aliphatic dinitriles of the invention are known compounds, and are obtained using known procedures. Such procedures are described, for example, in French patent No. 138,844, Belgian patent No. 677,175, Belgian patent No. 677,265, French patent No. 1,411,003, British patent No. 1,018,220, and *Journal of Organic Chemistry* 30 1357-60 (1965). Itaconitrile may be prepared from itaconic acid by known methods.

The 1,3-diene has the general formula

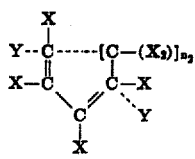

wherein X, Y and $n_2$ are as defined hereinbefore. Y is present only when $n_2$ is zero. Typical 1,3-dienes suitable for use in preparing the ring unsaturated cycloaliphatic dinitriles include butadiene, 2,3-dimethyl butadiene, 3-n-propyl hexadiene, isoprene, piperylene cyclopentadiene, hexachlorocyclopentadiene, hexachlorobutadiene, α-vinyl-naphthalene, anthracene, chloroprene, 2-methoxybutadiene, fulvene, and dicyclopentadiene.

In the Diels-Alder condensation for preparing the ring-unsaturated cycloaliphatic dinitrile starting material, the 2-methylene aliphatic dinitrile is reacted with the 1,3-diene in a molar ratio of the dinitrile compound to the diene within the range from about 0.8:1 to about 1.2:1, and preferably 1:1. A large excess of either reactant can lead to the formation of undesirable byproducts and thus should be avoided. The reaction can be carried out in the presence of an inert solvent or reaction medium, such as, for example, toluene, xylene, nitrobenzene, benzonitrile, and carbon tetrachloride. However, a solvent need only be employed if the 2-methylene aliphatic dinitrile and the 1,3-diene reactants are immiscible under reaction conditions.

In the Diels-Alder reaction of the 2-methylene aliphatic dinitrile with the 1,3-diene, the temperature of the reaction is maintained within the range from about 50° to about 200°C, and preferably from 110° to about 150°C. The reaction time should be within a range from about 0.25 to about 30 hours, and preferably from about 5 to about 15 hours. The desired product may be recovered from the resulting reaction product mixture by conventional procedures such as distillation and/or crystallization.

PREPARATION OF RING-SATURATED CYCLOALIPHATIC DIAMINES

The ring-unsaturated cycloaliphatic dinitriles are reduced to the corresponding ring-saturated cycloaliphatic di(amino-alkanes) by hydrogenating the ring-unsaturated cycloaliphatic dinitriles preferably in accordance with a two step procedure described in U.S. Pat. No. 3,584,045, titled "Cycloaliphatic Di(aminoalkanes)," which issued June 8, 1971.

The reduction of the nitrile groups and of the ring double bond is preferably carried out stepwise with the reduction of the nitrile groups as the first step. The first step preferably involves the hydrogenation of the nitrile groups in the presence of ammonia and a suitable catalyst such as cobalt or nickel. The second step preferably involves reduction of the ring double bond by hydrogenation in the presence of a suitable catalyst such as palladium or platinum. It is preferred to employ a stepwise procedure since complete reduction of the ring double bond is not obtained in a single step procedure. Reduction of the nitrile groups with a cobalt or nickel catalyst as an initial step is preferred since unwanted by-products such as condensed secondary and tertiary amines are formed when reduction of the ring double bond employing a palladium or platinum catalyst is carried out first.

PREPARATION OF THE DIISOCYANATES FROM THE DIAMINES

The ring-saturated cycloaliphatic diamines can be converted to the corresponding diisocyanates of the invention by reacting the diamine, or a salt thereof, with phosgene in accordance with the following equation:

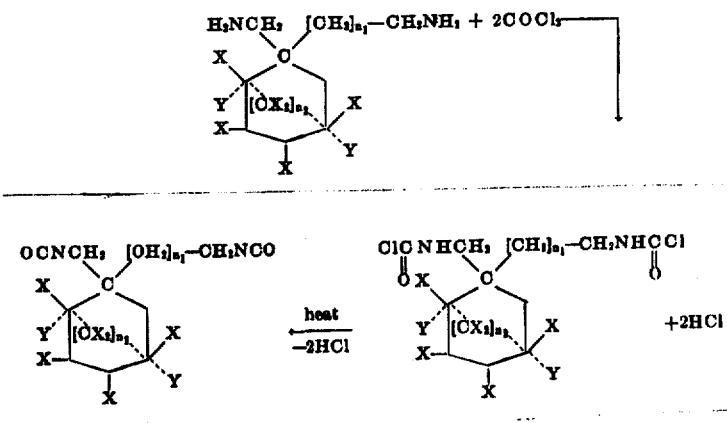

The hydrogenation of the ring-unsaturated cycloaliphatic dinitrile may be represented by the following equation:

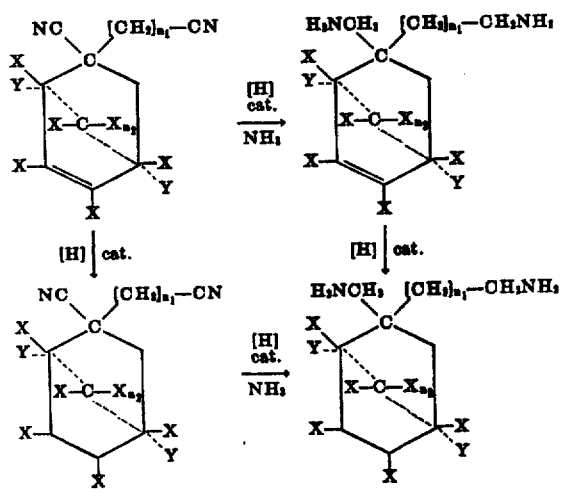

wherein X, Y, $n_1$, and $n_2$ are defined as hereinbefore.

The diisocyanate is formed by reaction with phosgene in excess of the amount stoichiometrically required, usually from about 2.2 to about 4 moles per mole of cycloaliphatic diamine. Two moles of phosgene react with each mole of the diamine to form the diisocyanate.

When the free cycloaliphatic diamine is employed, the initial stage of the reaction is carried out at a temperature below room temperature, and preferably at from about 0° to about 5°C. External cooling can be applied, and an excess of phosgene is employed in this initial stage.

The initial stage in the reaction is the formation of the carbamyl chloride and amine hydrochloride, but this product is not isolated. It is converted to the diisocyanate by liberation of the hydrogen chloride, in the second stage of the reaction, which is carried out at an elevated temperature.

During the second stage, the reaction mixture is kept under a flow of excess phosgene in order to drive the reaction to completion. The conversion is effected at a temperature within the range from about 125° to about 190°C, and preferably at from about 150° to about 180°C. The reaction is continued until liberation of hydrogen chloride has ceased. This may require from three up to about fifteen hours, depending upon the temperature and the structure of the diamine and diisocyanate.

If the acid salt of the cyloaliphatic amine is employed, it is unnecessary to carry out the reaction at low temperature. Instead, the reaction mixture can be heated at once under a flow of phosgene, and heating continued until liberation of hydrogen chloride has ceased, as before.

The reaction can be carried out in the presence of an inert solvent. Exemplary are aromatic hydrocarbons, such as toluene and xylene, nitrobenzene, nitriles, such as benzonitrile and chlorinated hydrocarbons, such as carbon tetrachloride and orthodichlorobenzene.

The cycloaliphatic diamine salts can, for example, be the hydrochloride, hydrobromide, and carbamate salts. These can be prepared from the amines by reaction with the corresponding acid and with carbon dioxide.

After completion of the reaction, the alkyl diisocyanate can be recovered by distillation of the solvent, if any, and phosgene, followed by distillation of the diisocyanate under reduced pressure, so as to keep the distillation temperature at below the decomposition temperature of the diisocyanate.

The diisocyanate can then be employed in the preparation of polyurethanes, polyamides, or diisocyanate-modified polyesters, as will be discussed following the working examples.

In preparing the alkyl diisocyanates of the invention, starting from the 1,3-diene or 1,3-cycloalkadiene and the 2-methylene aliphatic dinitrile, the above described operational steps can be carried out batchwise, in sequence, or in the form of a continuous operation, in which the reaction mixture from one step is processed so as to recover the desired reaction products, separating any unreacted materials and recycling them to the start of that step, and then passed to the next step. In a commercial operation, a continuous system is preferred..

The following examples in the opinion of the inventors represent preferred embodiments of their invention. The ring saturated cycloaliphatic diamines used as starting materials in the following examples were prepared in accordance with the procedure described in the aforementiond U.S. Pat. No. 3,584,045.

About 25 g of 1-(aminomethyl)-1-(3-aminopropyl)-cyclohexane were dissolved in about 75 ml. of methanol in a reactor and anhydrous hydrogen chloride was bubbled into the solution for about 2.5 hours while the solution was maintained at a temperature within a range from about 20° to 25°C. by means of a cooling bath. The hydrogen chloride was added until somewhat more than the theoretically required weight had been added for formation of the dihydrochloride. No solid precipitated during the addition. About 35.6 g of the solid hydrochloride were isolated by distilling off the methanol. The final traces of methanol were removed by azeotropic distillation with benzene.

About 30.4 g (0.125 mole) of the dihydrochloride were introduced into a reactor comprising a 500 ml. flask equipped with a gas-inlet tube,, stirrer, reflux condenser and thermometer along with 125 ml. of o-dichlorobenzene. The contents of the flask were heated at about 155°C. during which time phosgene at a rate of 60 cc./min. was introduced. The reaction was continued for about 8 hours. At the end of this period, the flow of phosgene was discontinued and the flask was purged with nitrogen gas for about 15 minutes. The solution was cooled and was then subjected to fractional distillation under vacuum. The solvent was removed at 10 mm. of Hg. pressure and the residue was distilled at 0.3 mm of Hg. A 1-(isocyanatomethyl)-1-(3 —ISOCYANATOPROPYL) cyclohexane product was as a colorless liquid boiling at 118°C. at 0.3 mm Hg.

Analysis of the product by titration with dibutylamine showed that the product was 98.3 percent pure. The structure of the product was confirmed to be that of 1-(isocyanatomethyl)-1-(3-isocyanatopropyl) cyclohexane by mass spectroscopy, by infrared analysis and by nuclear magnetic resonance. An analysis of the product for carbon, hydrogen, and nitrogen gave the following results:

|  | Found | Theoretical |
|---|---|---|
| % carbon | 65.05–64.96 | 64.82 |
| % hydrogen | 8.12–8.06 | 8.16 |
| % nitrogen | 12.57–12.60 | 12.60 |

1-(isocyanatomethyl)-1-(3-isocyanatopropyl) cyclohexane has a vapor pressure of 0.3 mm Hg. at 118°C. and is substantially less volatile than known aromatic and aliphatic diisocyanates employed in the manufacture of polyurethanes and thus is substantially less hazardous to handle.

EXAMPLE 2

About 40 g of the 1-(aminomethyl)-1-(3-aminopropyl)-4-ethyl-5-n-propyl-cyclohexane are dissolved in about 150 ml. of benzene and anhydrous hydrogen chloride is bubbled into the solution for about 2 hours while the solution is maintained at a temperature within a range from about 20° to about 25°C. by means of a cooling bath. The hydrogen chloride is added until somewhat more than the theoretically required weight has been added for formation of the dihydrochloride. About 52.1 g. of the solid hydrochloride are isolated by filtering of the resulting precipitate, washing with benzene and drying under vacuum at 50°C.

About 39.2 g (.125 mole) of the dihydrochloride are introduced into a 500 ml. flask equipped with a gas-inlet tube stirrer, reflux condenser and thermometer along with 125 ml. of o-dichlorobenzene. The contents of the flask are heated at about 165°C. during which time phosgene at a rate of 60 cc./min. is introduced. The reaction is continued for about eight hours. At the end of this period, the flow of phosgene is discontinued and the flask is purged with nitrogen gas for about 15 minutes. The solution is cooled and subjected to fractional distillation under vacuum. The solvent is removed at 10 mm of Hg. pressure and the residue is distilled at 0.1 mm of Hg. A 1-(isocyanatomethyl)-1-(3 —ISOCYANATOPROPYL)-4-ethyl-5-n-propyl-cyclohexane product is obtained as a colorless liquid.

EXAMPLE 3

About 30 g of the bicyclo [2.2.1]-2-(aminomethyl)-2-(3-aminopropyl)heptane are dissolved in about 150 ml of benzene and anhydrous hydrogen chloride is bubbled into the solution for about 2 hours while the solution is maintained at a temperature within a range from about 20° to 25°C by means of a cooling bath. The hydrogen chloride is added until somewhat more than the theoretically required weight has been added for formation of the dihydrochloride. About 42 g of the solid hydrochloride are isolated by filtering off the resulting precipitate and washing with benzene.

About 31.9 g (.125 mole) of the dihydrochloride are introduced into a 500 ml. flask equipped with a gas-inlet tube, stirrer, reflux condenser and thermometer along with 125 ml. of o-dichlorobenzene. The contents of the flask are heated at about 165°C. during which time phosgene at a rate of 60 cc./min. is introduced. The reaction is continued for about 9 hours. At the end of this period, the flow of phosgene is discontinued and the flask is purged with nitrogen gas for about 15 minutes. The solution is cooled and then subjected to fractional distillation under vacuum. The solvent is removed at 10 mm of Hg. pressure and the residue is distilled at o.1 mm of Hg. Bicyclo [2.2.1]-2-(isocyanatomethyl)-2-(3-isocyanatopropyl) heptane is obtained.

The alkylene diisocyanates of the invention can be employed to produce polyurethanes which are useful as foams, for example, for cushions and mattresses, and as a buoyant material. Such polyurethanes are characterized by having urethane groups separated by aliphatic, aromatic, mixed aliphatic-aromatic, or heterocyclic glycol units containing from two to about 12 carbon atoms and wherein the urethane groups contain high molecular weight groups in the side chain, namely the cycloaliphatic group of the diisocyanates, which impart to the polyurethanes a more hydrocarbon character than present in prior art polyurethanes and some of the properties of polyolefins, such as polyethylene and polypropylene.

Polyurethanes are prepared by reacting polyethers or aliphatic or aromatic glycols with polyisocyanates. The glycols customarily have a relatively low molecular weight, as compared to the resulting polyurethanes, and an aliphatic, aromatic or heterocyclic structure to which the hydroxyl groups are attached. The glycols normally are $\alpha,\omega$-glycols, i.e., the hydroxyl groups normally are at the ends of the aliphatic, aromatic or heterocyclic nucleus, and the nucleus, such as the aliphatic chain, can range up to about 12 carbon atoms, starting with ethylene glycol. The cyclic glycols can have two hydroxyl groups attached to the same ring, or to different rings themselves connected by a suitable linking group.

The polyisocyanate is also of low molecular weight, and is a diisocyanate in accordance with the invention.

The resulting polymers contain urethane groups derived from the relatively short-chain glycol and the original isocyanate. The urethane groups form an integral part of the polymeric chain, the properties of which to a large extent are determined by the relatively short glycol and long diisocyanate units. There is accordingly a high proportion of urethane groups per unit of molecular weight of the repeating groups in the chain. Expressed in another way, the polyurethanes of this type will normally have one urethane group for each twelve or more carbon atoms.

The reaction of the alkyl diisocyanates of the invention with glycols proceeds in accordance with the following equation to produce polyurethanes containing the following structure

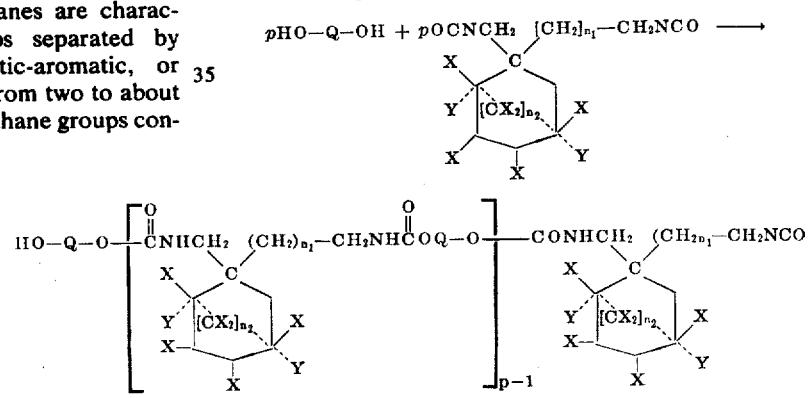

wherein $p$ is an integer within the range from two to about 1,000 or more and wherein Q is an aliphatic, alicyclic, aromatic, heterocyclic, or mixed aliphatic-aromatic group, having a straight or branched chain, containing from two to about 12 carbon atoms. Typical Q groups are

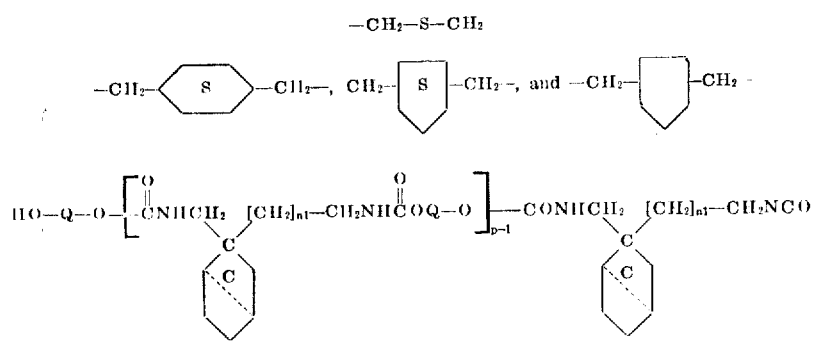

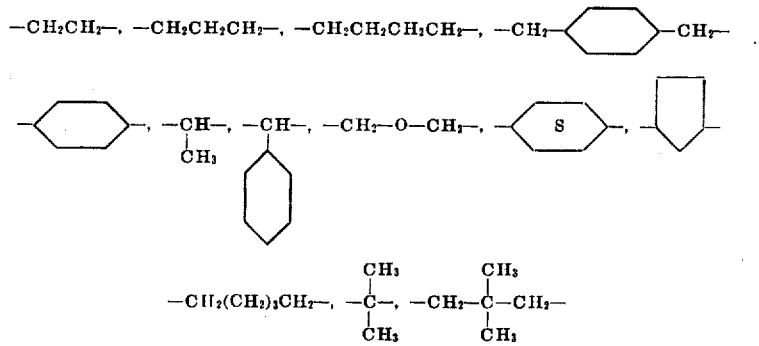

The aliphatic glycols suitable for use in reacting with the alkyl diisocyanates of the invention include alkylene glycols such as ethylene glycol, 1,2- and 1,3-propylene glycols, neopentyl glycol, butylene glycol - 1,4; -1,3; and -1,2; pentanediol-1,5; -1,4; -1,3 and -1,2; hexanediols, decanediols, dodecanediols, and the like.

Other examples of glycols include phenylene glycols, dimethylene phenylene glycols, cyclohexylene glycols, and cyclopentylene glycols.

The polyurethanes are formed by heating the glycol with an isocyanate for several hours, at a temperature at which the reaction proceeds, usually about 1 to 3 hours, at from about 75°C. to about 110°C. with occasional agitation, and then continuing the reaction for an additional time, from four up to about 14 hours, at a higher temperature, usually from about 125°C. to about 175°C. The upper limit of reaction temperature is not critical, and is limited only by the decomposition temperature of the glycol and the isocyanate.

If desired, a polyurethane catalyst may be used to increase the rate of reaction. Any of the known urethane catalysts can be employed. Such catalysts include the tertiary amines, such as N-methylmorpholine, pyridine, dialkyl aniline, dimethyl ethanolamine, triethylamine, and N,N'-diethyl cyclohexylamine, and metal organic compounds such as the polyvalent metal salts of organic acids, such as cobalt naphthenate and the acetyl acetonates such as ferric acetyl acetonate, and alkyl tin compounds, such as di-nitrityl-tin diacetate, di-n-butyl tin dilaurate, and tin octoate.

Catalytic amounts of these materials are sufficient. The amount depends upon the activity of the catalyst, as those skilled in the art are aware. Generally from about 0.0001 to about 1 percent catalyst by weight of the isocyanate yield good results. The upper limit is established by the rate of reaction.

The initial product of this reaction will generally be a thermoplastic polyurethane having properties both of urethanes and of the cycloaliphatic group of the diisocyanates.

If a strong, heat-resistant, substantially insoluble material is desired, the polyurethane can be cross-linked. The cross-linking is effected by the methods known to the art for cross-linking polyurethanes. For example, an excess amount of a diisocyanate can be employed, more diisocyanate than is theoretically required to react with all of the hydroxyl groups present in the glycol. Upon heating this material, after formation of the urethane, for several hours, usually from about 8 to about 20 hours, in the presence of water, which may be in the form of water added directly to the reaction medium or in the form of atmospheric moisture, a further reaction will take place between the urethane groups, and the excess diisocyanate present, converting the urethane groups to allophanate groups, thus producing a cross-linked structure. The additional diisocyanate molecules serve as crosslinks or bridges between polymer chains. The degree of cross-linking may be controlled by the amount of excess diisocyanate employed. A completely cross-linked material requires at leas one extra molecule of diisocyanate for every two urethane groups present.

If desired, other types of cross-linking agents may be employed. For example, the aromatic diamines and, in some cases, the aliphatic diamines and ditertiary peroxides may also be employed. Representative of this type of curing agent are dichlorobenzidine and p,p' - diaminodiphenylmethane. Additional details of the use of such diamine cross-linking agents may be found in U.S. Pat. No. 2,620,516 to Muller.

When diamine curing agents are employed, the amount of diisocyanate employed should more closely approximate that which is theoretically required to react with the OH groups present in the glycol. There should not be more than about 100 percent excess diisocyanate per mole beyond that required to react with all of the OH groups present in the reaction medium. If more isocyanate is present, the reaction between free isocyanate and diamine will often take precedence over the reaction between urethane and diamine, thereby preventing diamine cross-linking. When less isocyanate is employed, there will be incomplete cross-linking, which, for certain use, may be desirable. The use of less diamine may be desirable, if less cross-linking is desired. The reaction between urethane groups and amine groups gives rise to a substituted urea linkage. Additional reaction may convert the urea linkage to a biuret linkage.

The cross-linked product will vary, depending upon the original molecular weight of the glycol and the diisocyanate, from an insoluble wax-like material to an insoluble elastomeric material to a hard, rigid, plastic material. If it is desired to form a thread out of this material, the thermoplastic reaction product of the glycol with the diisocyanate may be extruded through a conventional thread extruder and thereafter passed through a hot bath of a curing agent, such as diamine, to yield an infusible, insoluble cross-linked elastomeric thread having excellent physical properties for use in making bathing suits, foundation garments and the like.

Where desired, various fillers may be added to the reaction product of this invention, such as carbon black, silica, colorants and other miscellaneous materials. These fillers may be added in accordance with conventional rubber and plastic technology, as for example, on a two-roll rubber mill or a Banbury mixer.

The following examples in the opinion of the inventors represent preferred embodiments of polyurethanes of the invention.

EXAMPLE 4

About 5 g of 1-(isocyanatomethyl)-1-(3-isocyanatopropyl)-cyclohexane of Example 1, 20 ml. of dry pyridine catalyst and 16 g of polyoxypropylene glycol, molecular weight of 400–2,000, are stirred together and slowly heated to 140°C in a polymerization reactor, and thereafter heated at 145°C for an additional nine hours. A pinkish clear plastic material is produced, which is molded in a press at about 150°C to produce a clear flexible film. Further heating of this film at 160°–170°C in the presence of atmospheric moisture for 20 hours produces an infusible, xylene— and dimethylformamide insoluble material.

EXAMPLE 5

About 5 g of 1-(isocyanatomethyl)-1-(3-isocyanatopropyl)-4-ethyl-5-n-propyl-cyclohexane of Example 2, 20 ml. of dry pyridine and 16 g of polyoxypropylene sorbitol, molecular weight of 700, are stirred together and slowly heated to 140°C, and thereafter heated at 145°C for an additional 9 hours. A pinkish clear plastic material is produced, which is molded in a press at about 150°C to produce a clear flexible film. Further heating of this film at 160°–170°C in the presence of atmospheric moisture for 20 hours produces an infusible, xylene-and dimethylformamide-insoluble material.

EXAMPLE 6

About 5 g of bicyclo [2.2.1]-2-isocyanatomethyl-2-(3-isocyanatopropyl) heptane of Example 3, 20 ml. of dry pyridine and 16 g of polyoxypropylene gloycol are stirred together and slowly heated to 140°C, and thereafter heated at 145°C for an additional 9 hours. A pinkish clear plastic material is produced, which is molded in a press at about 150°C to produce a clear flexible film. Further heating of this film at 160°–170°C in the presence of atmospheric moisture for 20 hours produces an infusible, xylene-and dimethylformamide-insoluble material.

The diisocyanates of the invention can also be reacted with carboxylic acids to produce polyamides or with polyesters to produce diisocyanate-modified polyesters. Thus, for example, bicycloalkane diisocyanates of the invention can be reacted with glycol-adipic acid polyesters to lenghten the polyester chains and this product can be cross-linked by reaction with water, glycols, diamines, or amine alcohols, employing conventional techniques, as described in *Polyesters and their Applications*, Bjorksten et al., (Reinhold 1960), pp. 225 to 228. The diisocyanate-modified polyesters are elastomers and have application as a rubber substitute as tires, conveyors and driving belts, shoe heels and soles and related products. In addition, they can be foamed by conventional techniques and used as such. Further applications for diisocyanate-modified polyesters are as adhesives, for example, for bonding wood, molding compounds, surface coatings, for example, in can coatings and in protective coatings for magnesium, iron and zinc, nonvolatile plasticizers in polyvinyl choloride, as described in *Polyesters and their Applications*, supra.

Having regard to the foregoing disclosure, the following is claimed as the inventive and patentable embodiments thereof:

1. Polyurethanes of the formula

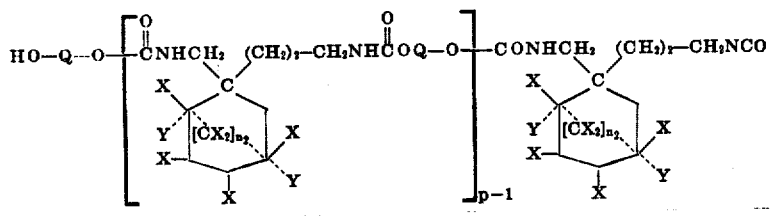

wherein X and Y are selected from the group consisting of hydrogen, halogen and alkyl having from one to six carbon atoms, $n_2$ is zero or one, Y is present only when $n_2$ is zero, Q is a straight or branched chain group having two to 12 carbon atoms and selected from the group consisting of aliphatic, aromatic, alicyclic, heterocyclic and mixed aliphatic-aromatic groups and p is an integer from two to one thousand.

2. Polyurethanes of the formula

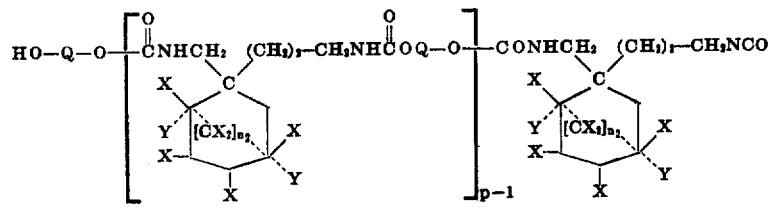

wherein X and Y are selected from the group consisting of hydrogen, halogen and alkyl having from one to six carbon atoms, $n_2$ is zero or one, Y is present only when $n_2$ is zero, Q is selected from the group consisting of

—CH₂CH₂—, —CH₂CH₂CH₂—, —CH₂CH₂CH₂CH₂—

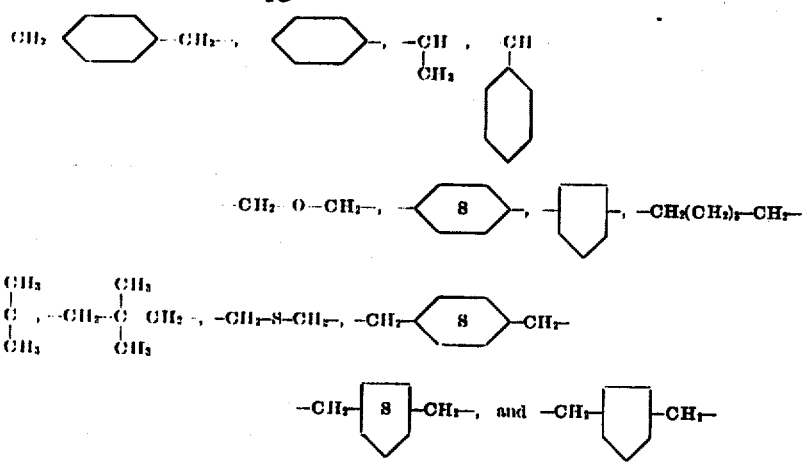

and $p$ is an integer from two to one thousand.

3. Polyurethanes as described in claim 1 wherein $n_2$ is zero and X and Y are selected from the group consisting of hydrogen and alkyl groups having from one to six carbon atoms.

4. Polyurethanes of the formula:

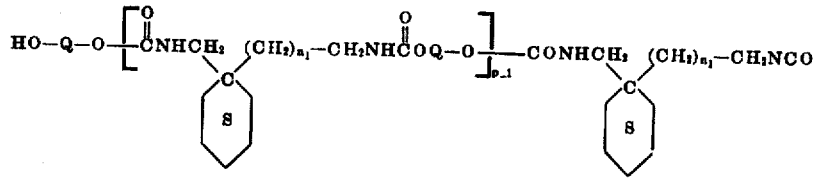

wherein Q and $p$ are as defined in claim 1.

5. Polyurethanes of the formula:

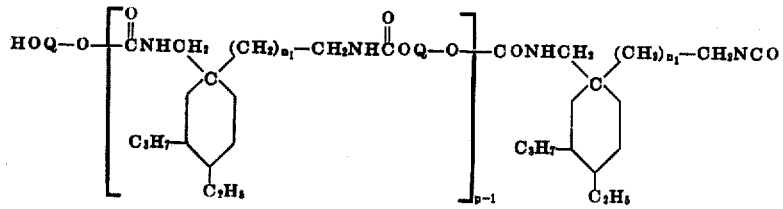

wherein Q and $p$ are as defined in claim 1.

6. Polyurethanes of the formula

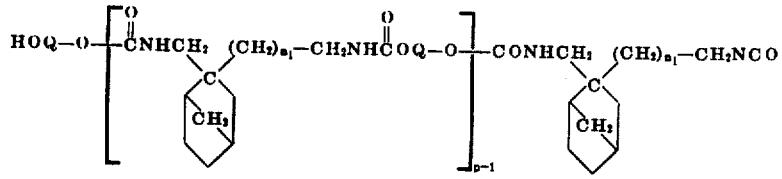

wherein Q and $p$ are as defined in claim 1.

* * * * *